Oct. 13, 1959     H. W. BROWN     2,908,777
ELECTRIC SWITCHES
Filed Sept. 17, 1956     6 Sheets-Sheet 1
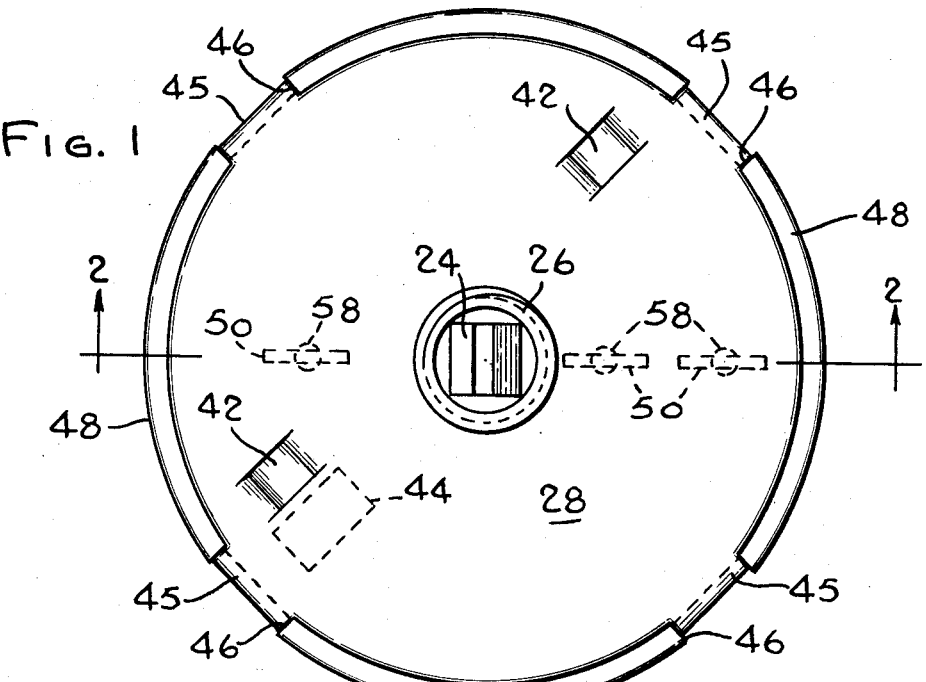
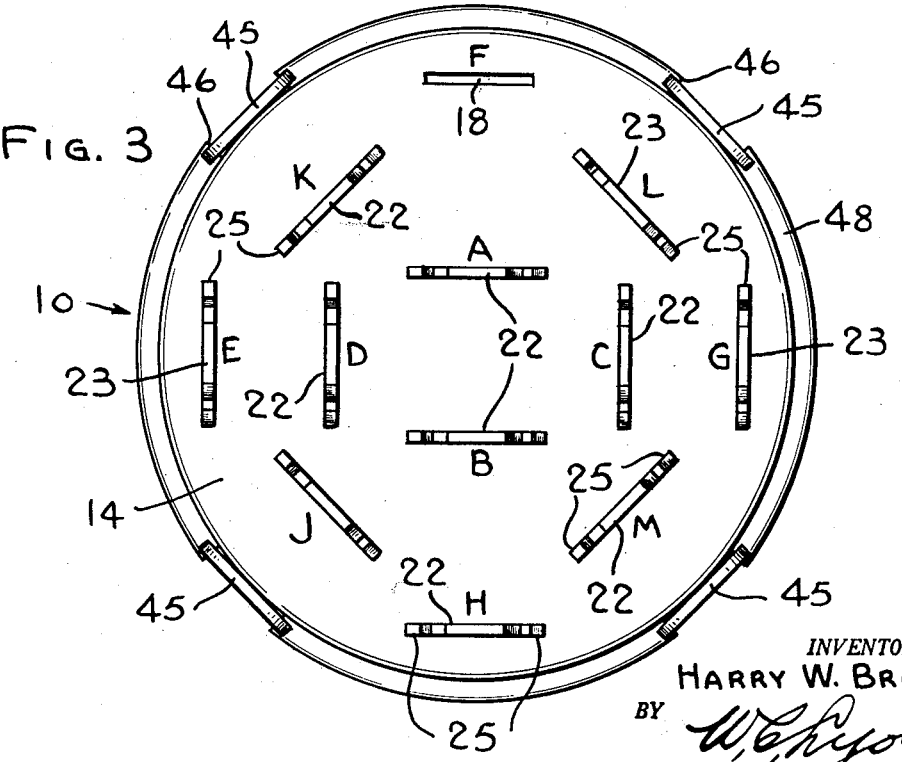
INVENTOR.
HARRY W. BROWN
BY
ATTORNEY Oct. 13, 1959     H. W. BROWN     2,908,777
ELECTRIC SWITCHES
Filed Sept. 17, 1956                       6 Sheets-Sheet 2

INVENTOR.
HARRY W. BROWN
BY
ATTORNEY

Oct. 13, 1959  H. W. BROWN  2,908,777
ELECTRIC SWITCHES
Filed Sept. 17, 1956  6 Sheets-Sheet 3
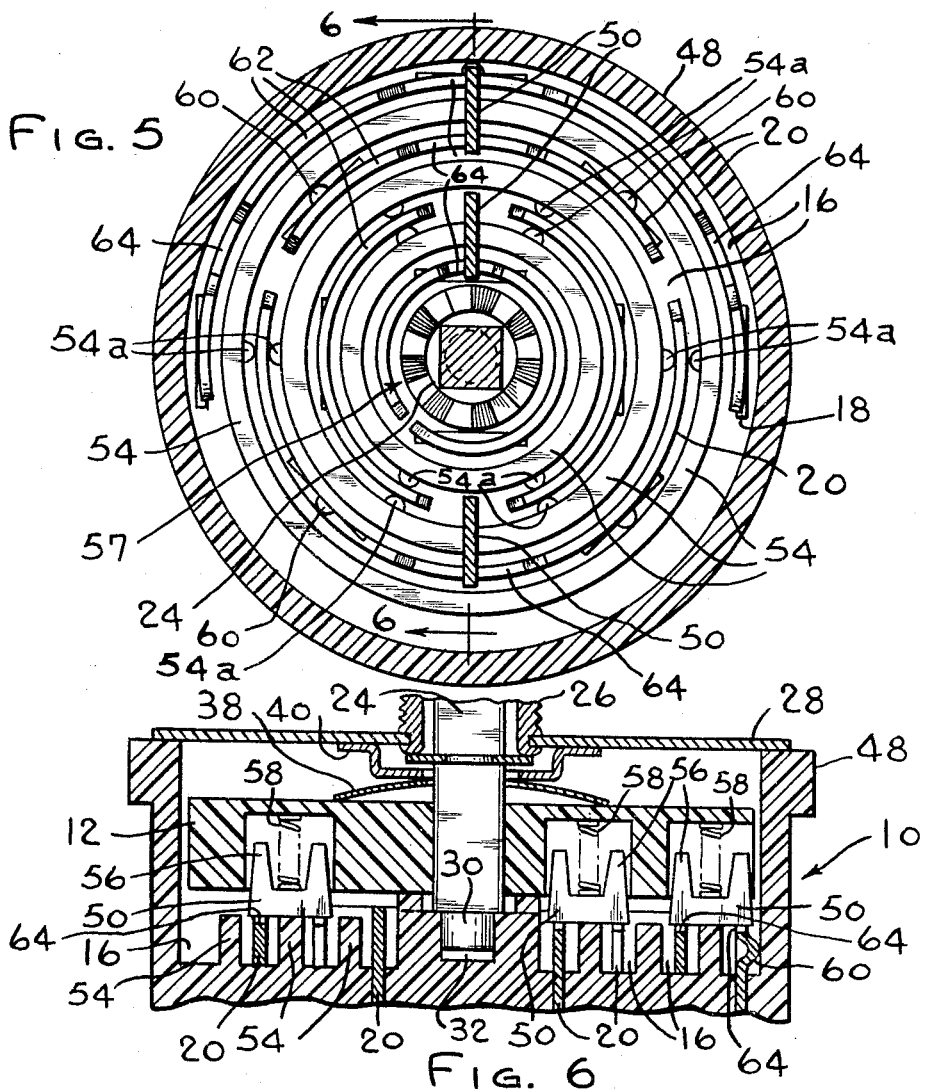
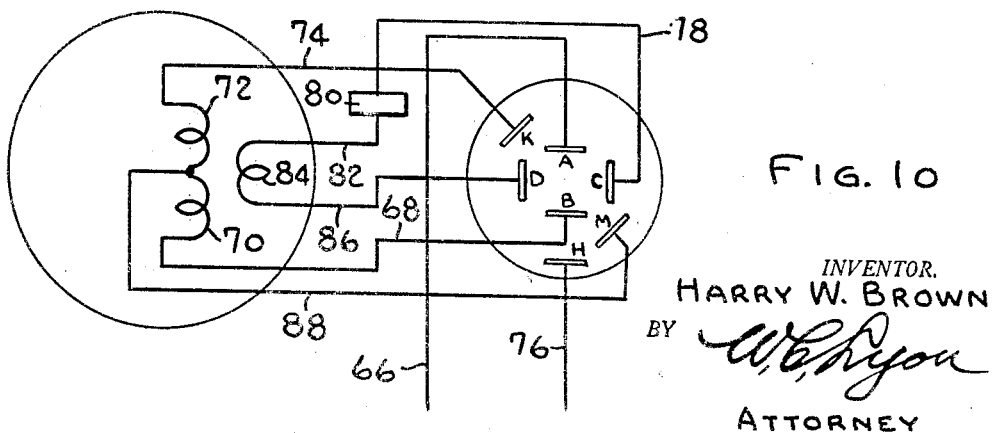
INVENTOR.
HARRY W. BROWN
BY W. E. Lyon
ATTORNEY Oct. 13, 1959 H. W. BROWN 2,908,777
ELECTRIC SWITCHES
Filed Sept. 17, 1956 6 Sheets-Sheet 4

INVENTOR.
HARRY W. BROWN
BY W. C. Lyon
ATTORNEY

Oct. 13, 1959  H. W. BROWN  2,908,777
ELECTRIC SWITCHES
Filed Sept. 17, 1956  6 Sheets-Sheet 5
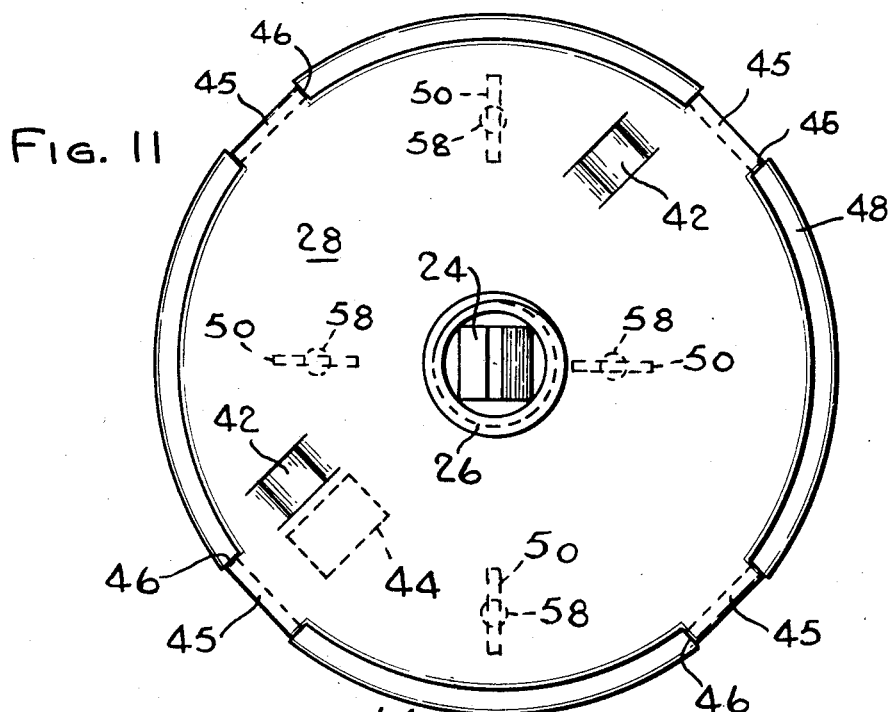
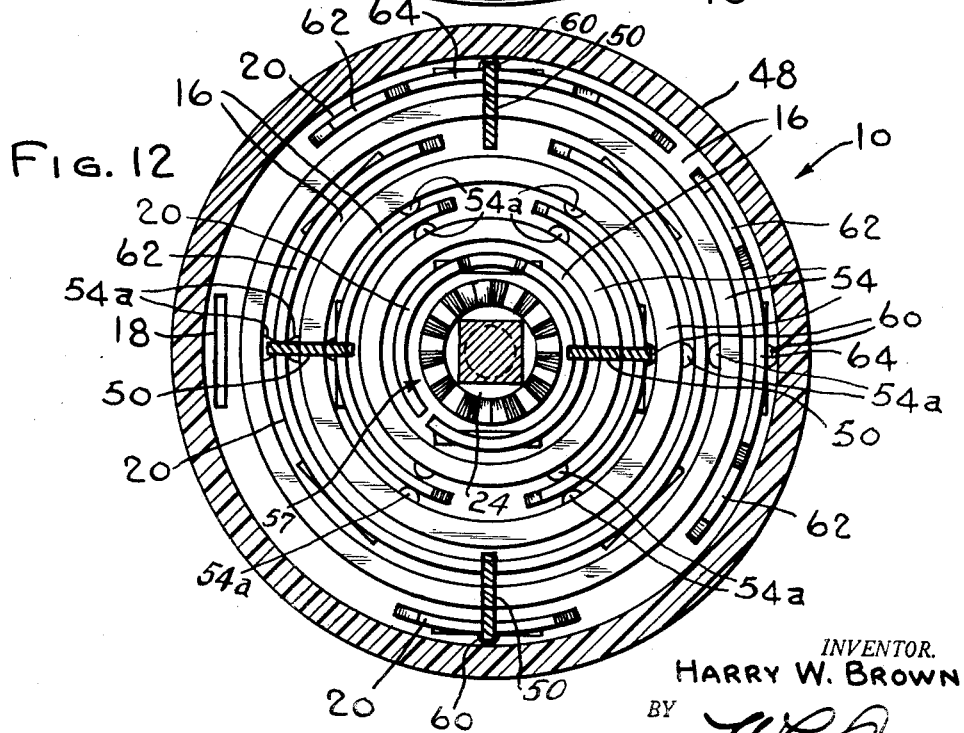
INVENTOR.
HARRY W. BROWN
BY
ATTORNEY Oct. 13, 1959   H. W. BROWN   2,908,777
ELECTRIC SWITCHES
Filed Sept. 17, 1956   6 Sheets-Sheet 6
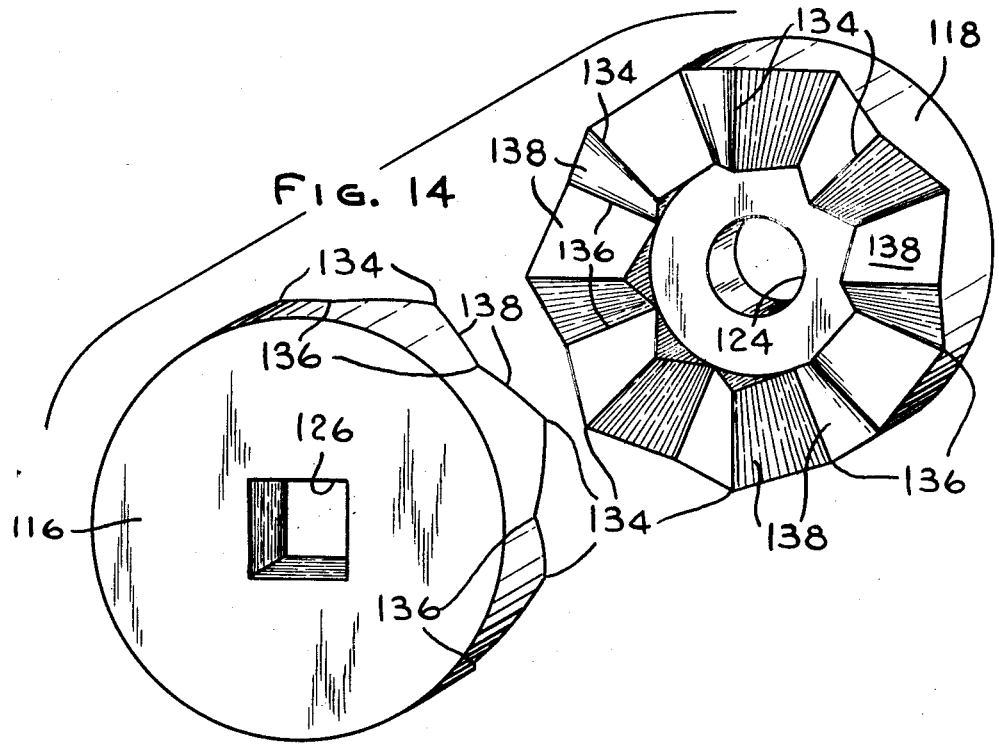
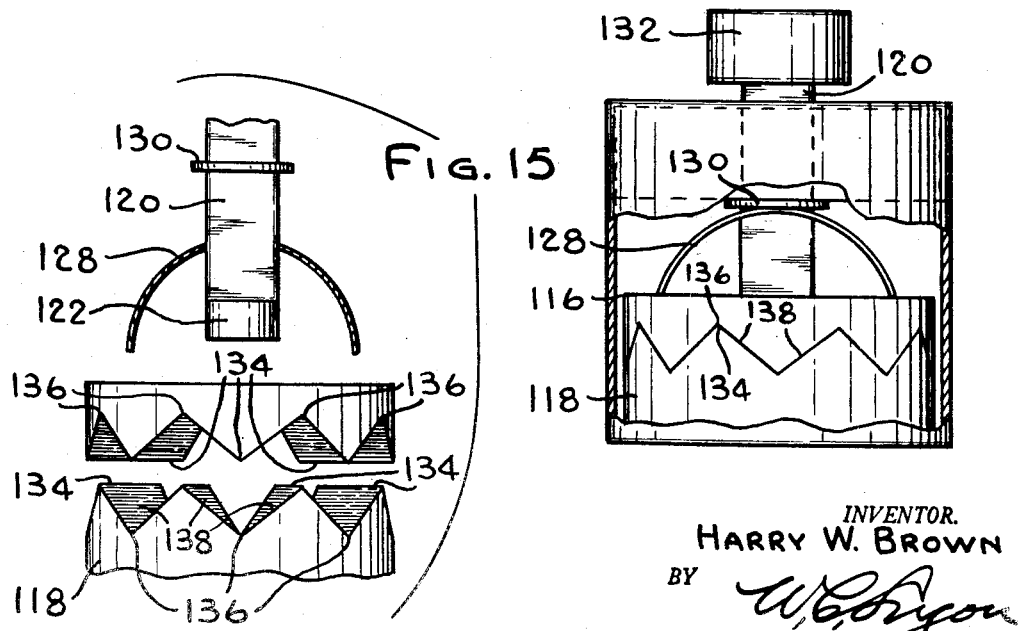
INVENTOR.
HARRY W. BROWN
BY
ATTORNEY ବ
United States Patent Office 2,908,777
Patented Oct. 13, 1959

2,908,777
ELECTRIC SWITCHES

Harry W. Brown, Milwaukee, Wis., assignor to Cutler-Hammer, Inc., Milwaukee, Wis., a corporation of Delaware Application September 17, 1956, Serial No. 610,330

10 Claims. (Cl. 200—11)

This invention relates to electric switches of the type particularly adapted to control a plurality of circuits. Although not limited thereto, for purposes of explanation and description this invention is embodied in a switch for reversing fan duty.

It is an object of this invention to provide a switch of this type which: has a high rating and a minimum leakage factor; is dust resistant, light in weight and compact; and inexpensive to manufacture in a variety of arrangements.

Another object is to provide an indexing means for a switch or the like, which is long wearing, has smooth operation and simulates snap action.

These objects are attained by a switch having a multiplicity of electrical contacts—which are preferably in the form of metal segments of cylindrical form—spaced by a wall of insulating material. A metal contactor carried by an actuating member of non-conductive material overlies such wall and segments and has relative motion with respect thereto. Such contactor may be spring-biased toward such segments. For that portion of such relative motion where contact is desired, the segments extend beyond the wall or the wall is depressed below the segments thereby allowing the contactor to have slidable contact with such segments. For that portion of the relative motion where no contact is desired, the segments are notched below the wall or the wall raised above the segments, thereby causing the insulating wall to keep the contactor out of engagement with the segments. Thus, during part of the relative motion contact is established and for another part of such motion contact remains broken. Additional sets of segments, walls, and metal contacts may be incorporated in a single unit operated by a single actuating member. Standardized bases made from one molding die of one design (with interchangeable index forming insets) may carry a variety of different length and differently notched contact terminal segments. Thus, a large variety of switches having different characteristics can be inexpensively made by using as standardized parts those most expensive to manufacture and as variable interchangeable parts those least expensive to manufacture. Molding die costs are thus kept to a minimum.

The segments are mounted in the insulating base with clearance space between such segments and the adjacent walls of the grooves. This enhances heat dissipation and increases the length of leakage gap to give a high rating and minimum leakage factor. Properly spaced projections on the segments and such walls securely hold the segments so spaced. Terminals integral with such segments extend from the insulating base and preferably are staked, as shown, to furnish additional holding means.

Switches of the basic structure of this invention may be readily constructed for control by a rotatably movable actuating member. In such case the contact terminal segments are arcuately shaped and concentrically arranged about the axis of rotation of such member. Such member may take the form of a disc which entirely overlies the segments. In this type an indexing mechanism may be used having parts rotatable relatively about a common axis with opposing teeth which are spaced angularly about such axis. These teeth have line ridges and bases and the faces between ridge and base are ruled surfaces defined by a line moving from one to the other of the base and ridge while parallel to a plane perpendicular to such axis and while rotating with respect to such axis. The rate of movement between base and ridge and the rate of rotation are proportioned so that the desired angle of indexing and the desired height of the teeth are obtained.

Figure 1 is a top plan view, approximately three times normal dimensions, of a rotary selector switch embodying the invention;

Fig. 3 is a correspondingly enlarged bottom plan view of the switch;

Fig. 5 is a view similar to Fig. 4, but with the contactors rotated ninety degrees in a counterclockwise direction;

Fig. 6 is a sectional view similar to Fig. 2, taken along line 6—6 of Fig. 5;

Fig. 10 is a circuit diagram of one application for the switch using the arrangement of segments and contactors shown in Figs. 1, 2, 3, 4, 5, 6 and 9;

Fig. 11 is a view similar to Fig. 1, but with a different arrangement of contactors in the actuating disc;

Fig. 12 is a view similar to Fig. 4, but with a different contactor arrangement, and a different arrangement and configuration of contact terminal segments;

Fig. 14 is an enlarged perspective view of a cooperative pair of molded insulating members having opposing sets of teeth of the functional character used in the indexing mechanism of this invention;

Fig. 15 is an enlarged exploded fragmentary view in side elevation of two opposing sets of teeth of the character utilized herein; and Fig. 16 is an enlarged diagrammatic illustration, in side elevation, indicating the mechanical operating characteristics of an indexing mechanism of the character herein disclosed.

Figure 2:
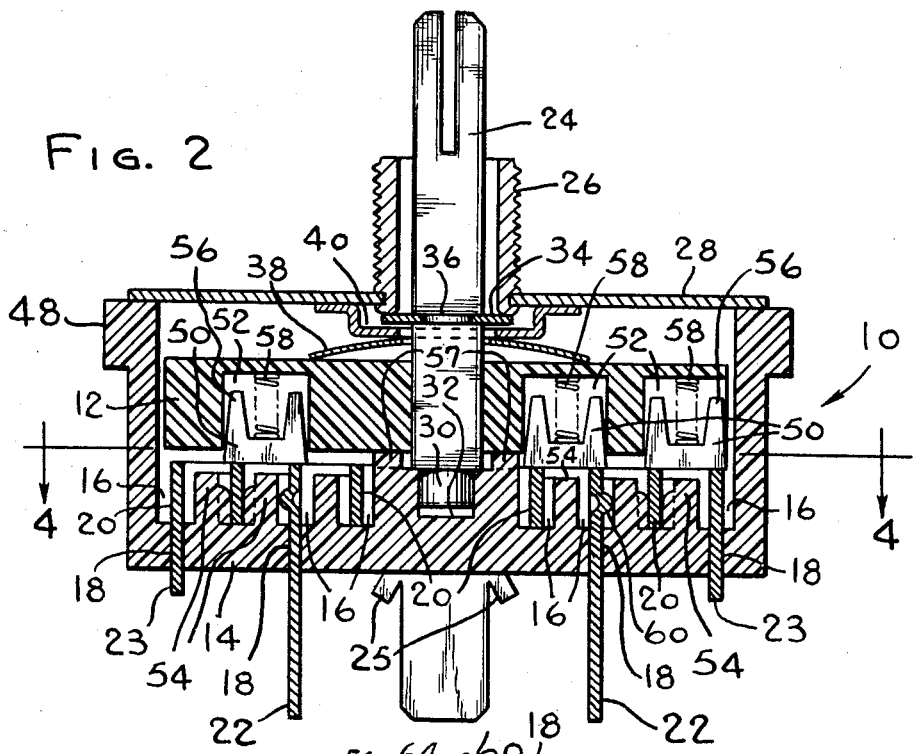
Fig. 2 is a sectional view, taken along line 2—2 of Fig. 1.

Referring to the drawings, Fig. 2 shows a cup-shaped molded insulating base 10 and a molded insulating disc 12 rotatably mounted in the base in juxtaposition with the bottom 14 of the latter. The base 10 and disc 12 are formed of a suitable material such as a phenolic resin. The bottom 14 of the base has radially spaced arcuately extending grooves 16 with openings 18 extending from the grooves to the outside of the base. Metal contact terminal segments 20, of arcuate form, with terminals 22 extending out through openings 18 are positioned in the various grooves 16. Portions 23 of segments 20 and plug-type terminals 22 are staked, as at 25, to the bottom of the base to hold the segments securely in place. An actuating shaft 24, of square form in transverse cross section, extends out through a threaded bushing 26 rigidly attached to a sheet metal cover member 28. The reduced, cylindrical, inner end portion 30 of shaft 24 is positioned in a circular cavity 32 in the bottom of the base and is prevented by a "snap-on" type of washer 34 in a groove 36 on the shaft—when all parts have been assembled—from coming out of the base 10. Disc 12 is mounted on shaft 24 for rotation therewith and is biased toward the base member 14 by a spring washer 38, held under compression by cover member 28 through the medium of a suitable form of spacing washer 40 attached to said cover member. The rotational movement of disc 12 is shown as limited to an arc of 180 degrees by sheared and downwardly pressed portions 42 of cover 28 which are respectively adapted to be engaged by opposite sides of a raised portion 44 formed integrally with the top surface of said disc. Arms 45 on cover 28 (Figs. 1, 2 and 11) are bent over and secured in notches 46 in the peripheral wall portion 48 of the base 10 to hold the cover securely in place and thereby keep dust and other foreign material out of the interior of the switch.

Figure 4:
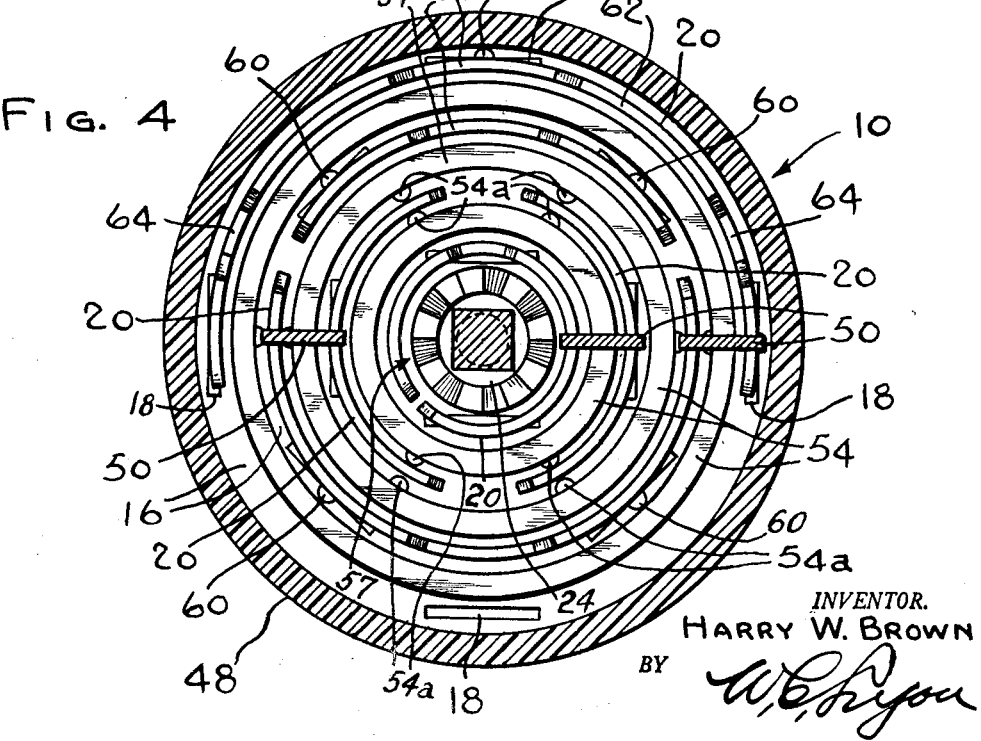
Fig. 4 is a sectional view, taken along line 4—4 of Fig. 2.
Figure 9:
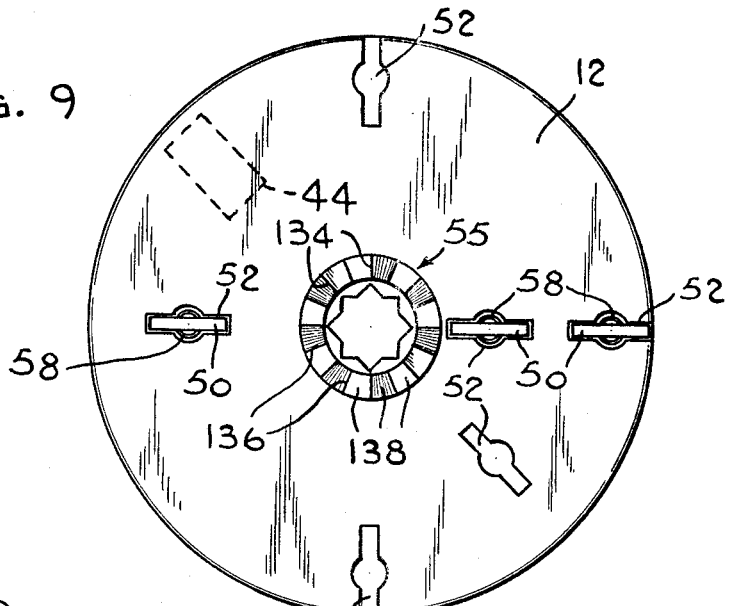
Fig. 9 is a bottom plan view of the actuating disc with three of the six cavities therein occupied by bridging contactors.

Metal contactors 50 mounted in cavities 52 in the inner face of disc 12 overlie walls 54 and contact segments 20 and are in contact with either of the same. Parts 56 of contactors 50 extend into cavities 52 to guide the contactors in sliding engagement with segments 20 and walls 54 during movement of disc 12 away from bottom 14 during the operation of the indexing mechanism comprising opposing teeth 55 (Fig. 9) and 57 (Figs. 4 and 5) on the disc 12 and the bottom of the base recess, respectively; which are described in detail hereinafter. Contactors 50 are biased into engagement with the walls 54 and/or segments 20 by compression springs 58, and parts 56 thereof have tapered sides to permit a predetermined degree of tilting of the contactors 50 individually to insure uniform contact pressure.

The main body portions of walls 54 and segments 20 are spaced from each other to provide clearance between the respective adjacent surfaces thereof; to greatly increase the leakage gap between adjacent segments, and to increase the degree of heat dissipation from the parts; to thereby improve the rating of the switch. Projections 54a on the walls 54, and 60 on the segments 20 serve to maintain the necessary spacing and securely position the segments in grooves 16.

Figure 7:
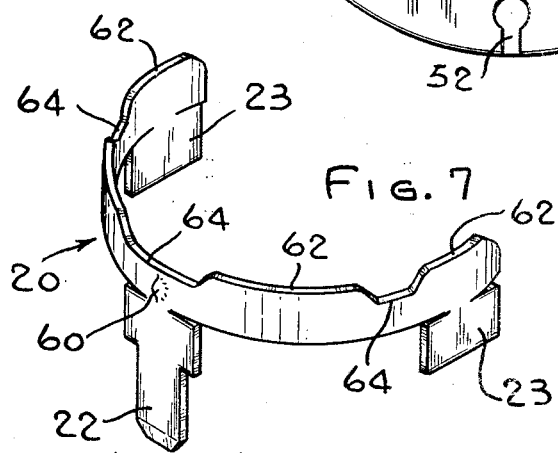
Fig. 7 is an enlarged perspective view of a typical outer contact terminal segment.
Figure 8:
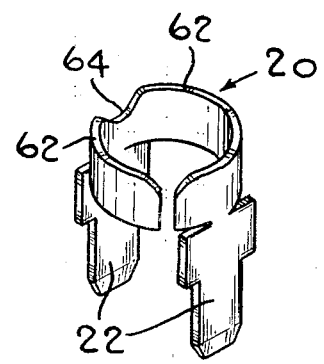
Fig. 8 is an enlarged perspective view of a typical inner contact terminal segment.

Figs. 7 and 8 show the detailed construction of two typical outer and inner segments respectively designated generally by reference numeral 20. The segments 20 are positioned in grooves 16 in the bottom of the base 10 with the top edges 62 of adjacent segments extending above the walls 54 at selected related angular positions and with notched-out portions 64 below the tops of walls 54 at other selected positions to provide areas where contactors 50 move in engagement with adjacent segments and areas where they move in non-engagement with said segments. Figs. 5 and 6 show the parts shown in Figs. 2 and 4; but with disc 12 rotated ninety degrees in a counterclockwise direction (as viewed from above). In the Fig. 2 position, contactors 50 are positioned in contact with the top edges 62 of the segments; whereas in Fig. 6 there is no contact since the contactors either overlie notched-out portions 64 of the segments or are positioned over the spaces between the ends of one segment; or the ends of two segments which lie in the same groove 16 in the bottom 14 of the base. Thus, by connecting adjacent segments into electrical circuits by means of terminals 22 such circuits can be opened and closed by the movement of disc 12 back and forth between the position thereof shown in Figs. 2 and 4 and that shown in Figs. 5 and 6; for example, a large variety of switches having different circuit controlling characteristics can be made by varying the number, configuration and relative position of segments 20 in the grooves 16, and the number and relative position of contactors 50 mounted in cavities 52 in disc 12. The construction of base 10 and disc 12 with the exception of the opposing teeth 56 for the indexing mechanism is preferably uniform for all forms of switches herein contemplated. However, the angle of indexing can be changed by simply changing an insert in the molds used in making the disc and the base. Thus a large variety of switches having different circuit controlling characteristics can be inexpensively made because all of the parts are substantially completely standardized, with the exception of the stationary contact segments, which are of the type least expensive to manufacture.

Figure 13:
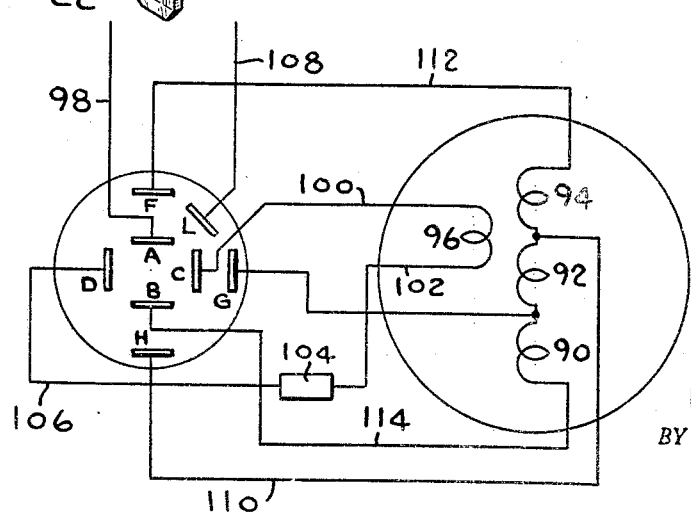
Fig. 13 is a circuit diagram of one application for a switch using the segment and contactor arrangement shown in Figs. 11 and 12.

Figs. 10 and 13 show specific examples of two of the great variety of circuits which are adapted for control by a switch of this type. Fig. 10 illustrates utilization of such a switch affording reversing fan duty control, in which the fan motor has a main winding 70, a reactor winding 72 and an auxiliary winding 84. The particular switch used to control the circuits shown in Fig. 10 may utilize the segment and contactor arrangement shown in Figs. 1, 2, 3, 4, 5, 6 and 9. The following table gives the various internal circuits set up by the five positions (forty-five degree indexing) of this switch, starting with position No. 1 as being that shown in Figs. 2 and 4; with each succeeding position being that obtained by rotating disc 12 through an angle of forty-five degrees in a counterclockwise direction. Position No. 3 will therefore be that shown in Figs. 5 and 6.

| Position No.: | Internal switch circuit |
| --- | --- |
| 1 | A—B—C, K—D—H. |
| 2 | A—B—C, K—D, H—M. |
| 3 | Off. |
| 4 | A—B—D, K—C, H—M. |
| 5 | A—B—D, K—C—H. |

In position No. 1 circuit flows from a source of alternating current through conductor 66, switch circuit A—B, conductor 68, main winding 70, reactor winding 72, conductor 74, switch circuit K—H, and conductor 76; and through conductor 66, switch circuit A—C, conductor 78, capacitor 80, conductor 82, auxiliary winding 84, conductor 86, switch circuit D—K—H, and conductor 76. With the auxiliary winding 84 thus energized the motor runs in the forward direction and at a reduced speed, since both reactor and main windings are energized. In position No. 2 current flows from the source through conductor 66, switch circuit A—B, conductor 68, main winding 70, conductor 88, switch circuit M—H, and conductor 76. The auxiliary winding 84 is energized in the same manner as in position No. 1. Thus the fan runs in the forward direction but at an increased speed due to the removal of the reactor winding 72 from the circuit. In position No. 3 (see Figs. 5 and 6) all internal switch circuits are open so the fan motor is off. Positions Nos. 4 and 5 are similar to positions Nos. 2 and 1, respectively, except that auxiliary winding 84 is connected through the switch from conductor 66 to conductor 86 thus changing its polarity with respect to the main winding, and thereby reversing the direction of operation of the motor.

Fig. 13 shows an application for reversing fan duty in which the fan motor has a main winding 90, reactor windings 92 and 94 and auxiliary winding 96. The switch used to control the circuits shown in Fig. 13 uses the segment and contactor arrangement shown in Figs. 11 and 12. The following table gives the various internal circuits set up by the seven positions (thirty degree indexing) of this switch starting with position No. 1 as that shown in Figs. 11 and 12; with each succeeding position being that obtained by rotating disc 12 thirty degrees in a counterclockwise direction.

| Position No: | Internal switch circuit |
| --- | --- |
| 1 | A—B—C, L—D—F. |
| 2 | A—B—C, L—D—H. |
| 3 | A—B—C, L—D—G. |
| 4 | Off. |
| 5 | A—B—D, L—C—G. |
| 6 | A—B—D, L—C—H. |
| 7 | A—B—D, L—C—F. |

In position No. 1 current flows from a source of alternating current through conductor 98, switch circuit A—C, conductor 100, auxiliary winding 96, conductor 102, capacitor 104, conductor 106, switch circuit D—L, and conductor 108; and through conductor 98, switch circuit A—B, conductor 114, main winding 90, reactor windings 92, 94, conductor 112, switch circuit F—L, and conductor 108. With the auxiliary coil 96 thus energized the motor runs in the forward direction and at a reduced speed since the reactor windings 92, 94 and main winding 90 are energized. In position No. 2 current flows from the source through conductor 98, switch circuit A—B, conductor 114, main winding 90, reactor winding 92, conductor 110, switch circuit H—L and conductor 108. The auxiliary coil 96 is energized in the same manner as in position No. 1. Thus the fan continues to run in the forward direction but at an increased speed due to the removal of reactor winding 94 from the circuit. Position No. 3 further increases the speed by removing reactor winding 92 from the circuit. Position No. 4 is the Off position and positions Nos. 5, 6 and 7 are similar to Nos. 3, 2 and 1, respectively, except that auxiliary winding 96 is connected through the switch from conductor 98 to conductor 108 thus changing its polarity with respect to the main winding and thereby reversing the direction of the motor.

The indexing mechanism previously referred to is shown by way of example, in greater mechanical detail in Figs. 14, 15 and 16. Indexing members 116 and 118 are rotatably mounted for relative movement about a common axis with opposing interfitting teeth angularly spaced about such axis. Teeth having closely interfitting "hill and valley" form, spaced at intervals of forty-five degrees, or thirty degrees; on each member 116 and 118; have been found suitable for many applications.

The members are mounted on an initially square actuating shaft 120 with a reduced, cylindrical, inner end portion 122 rotatable within a circular bearing opening 124 in a member 118 (which is restrained against both rotary and axial movement) and a square cross-sectional portion freely passing through a square opening 126 in member 116, to permit axial displacement of the latter. The member 116 is resiliently biased toward member 118 by a spring washer 128 mounted on the shaft and held under compression by a shoulder, or a snap-on washer 130 on the shaft. Indexing is accomplished by turning a knob 132 fixedly mounted on the shaft 120 which rotates member 116 relative to member 118.

The teeth have line ridges 134 and line bases 136 at the junctures between faces 138 of the teeth. The faces are ruled surfaces generated by a line moving from base to ridge while parallel to a plane perpendicular to the axis of rotation and while rotating with respect to such axis. The rate of axial movement between base and ridge and the rate of rotation are proportional so that the desired angle of indexing and tooth height are obtained.

Cooperating molded insulating members having teeth of this description can be formed from dies made by successive cuts of a shaper tool all made along lines parallel to a plane perpendicular to the axis of rotation and either tangent to a surface cylindrical to the axis or intersecting the axis. After each cut either the tool or the die member being produced is repositioned by rotating about the axis of rotation and moving axially of the axis; the degree of rotation and distance of axial movement being proportional for a given tooth height and degree of indexing. Smooth surfaces are obtained on teeth cut in die members in this manner by filing or grinding the mating surfaces of such die members (not shown) after cutting.

The indexing mechanism just described is long wearing and smooth operating due to the novel configuration of the teeth which provide surface contact over the entire area of overlap at all positions of relative rotation. It simulates snap action due to the line contact at the ridges and subsequent smooth mating surfaces which causes the opposing teeth to move quickly from an instantaneous high point.

I claim:

1. A switch comprising an insulating base having a plurality of arcuate concentrically arranged spaced grooves, a plurality of arcuate contact terminal segments mounted in some of said grooves with upper edges protruding above the tops of said grooves, said segments having notched-out portions below the tops of said grooves, said segments being capable of arrangement in a variety of positions in said grooves whereby said notched-out portions are arranged at selected related angular positions, an insulating member rotatably mounted in said base in juxtaposition to said grooves and segments, said member having a plurality of cavities arranged to lie over the spaces between adjacent segments, and contactors mounted in some of said cavities and overlying adjacent segments to simultaneously engage said segments, said contactors being biased toward said segments and said base, said contactors being capable of arrangement in a variety of said cavities to vary the relation between said contactors and said segments and said notched-out portions of the latter.

2. A switch comprising a cup-shaped insulating base having a bottom, said bottom having spaced arcuately extending grooves, openings extending from said grooves to the outside of said base, elongated arcuate contact segments positioned in said grooves, said segments having terminals extending out through said openings, an insulating disc rotatably mounted in said cup-shaped insulating base in juxtaposition to said bottom, said disc having contactors carried thereby, said contactors being resiliently loosely mounted on said disc and held in sliding engagement with said segments and base, and said segments having portions below parts of said bottom whereby for part of the movement thereof said contactors will be held out of contact with said segments.

3. A switch according to claim 2 in which there is an indexing mechanism indicating angularly spaced positions of said disc comprising cooperating parts formed on said bottom and on said disc with said disc resiliently biased toward said bottom to keep said parts in contact.

4. A switch according to claim 3 in which said contactors have parts in said cavities to guide said contactors in sliding engagement with said segments and base during movements of said disc away from said base due to the operation of said indexing mechanism.

5. A switch comprising a cup-shaped insulating base having a bottom, said bottom having spaced arcuately extending grooves, openings extending from said grooves to the outside of said base; contact segments positioned in said grooves, said segments having terminals extending out through said openings, an insulating disc rotatably mounted in said cup-shaped insulating base in juxtaposition to said bottom, said disc having cavities for contactors, said contactors being spring-biased outwardly from said cavities for sliding engagement thereof with a pair of said segments or with said base, and said segments having portions thereof positioned below parts of said bottom, whereby for part of the movement of said contactors the same will be held out of bridging engagement with at least one of said pair of segments.

6. A switch comprising a pair of elongated metal contacts, a wall of non-conductive material between said contacts and spaced therefrom to provide a clearance between the adjacent surfaces of said contacts and wall to thereby increase the leakage gap between adjacent contacts and increase heat dissipation, a metal contactor overlying said wall and said contacts, and actuating means for imparting relative motion between said contacts and said contactor, portions of said contacts being offset with respect to portions of said wall to provide areas where said contactor moves simultaneously in engagement with both of said contacts to complete an electric circuit therebetween and areas where said contactor moves in non-engagement with said contacts.

7. A switch comprising a pair of elongated metal contacts, a wall of non-conductive material between said contacts, a metal contactor overlying said wall and said contacts, and actuating means for imparting relative motion between said contacts and said contactor, portions of said contacts being offset with respect to portions of said wall to provide areas where said contactor moves simultaneously in engagement with both of said contacts to complete an electric circuit therebetween and areas where said contactor moves in non-engagement with said contacts, said actuating means including a member of non-conductive material in which said contactor is loosely mounted and resiliently biased towards said contacts and said wall, said contactor being a conductive part with tapered sides loosely mounted in a vertically walled cavity in said member to permit tilting movement of said contactor to insure uniform contact pressure.

8. A switch comprising a pair of elongated metal contact segments which are arcuately shaped and concentrically arranged, an arcuately shaped wall of non-conductive material extending upwardly between said segments, a metal contactor overlying said wall and said segments, and actuating means for imparting relative motion between said segments and said contactor, portions of said segments being offset with respect to portions of said wall to provide areas where said contactor moves simultaneously in engagement with both of said segments to complete an electric circuit therebetween and areas where said contactor moves in non-engagement with said segments.

9. A switch according to claim 8 in which said actuating means includes a member of non-conductive material in which said contactor is loosely mounted and resiliently biased toward said segments and said wall.

10. A switch according to claim 8 in which said wall is integral with a base and defined by spaced concentrically arranged circular grooves, said segments being mounted in said grooves.

References Cited in the file of this patent

UNITED STATES PATENTS

| | | |
|---|---|---|
| 2,077,684 | Gensburg | Apr. 20, 1937 |
| 2,558,412 | Baldwin | June 26, 1951 |
| 2,594,658 | Koonz | Apr. 29, 1952 |

FOREIGN PATENTS

| | | |
|---|---|---|
| 332,761 | Germany | Feb. 5, 1921 |
| 449,400 | Germany | Sept. 13, 1927 |
| 574,959 | Germany | Apr. 21, 1933 |
| 595,199 | Germany | Apr. 3, 1934 |
| 311,376 | Italy | Sept. 29, 1933 |
| 916,979 | France | Sept. 2, 1946 |